Patented Jan. 11, 1927.

1,614,305

UNITED STATES PATENT OFFICE.

MAXWELL O. JOHNSON, OF WAIPIO, TERRITORY OF HAWAII.

PROCESS OF FERTILIZING PLANTS AND FERTILIZER COMPOSITION.

No Drawing.   Application filed March 16, 1923. Serial No. 625,619.

The invention relates to a process for fertilizing plants and to a fertilizing composition for use therein, the process and composition being especially useful for curing and fertilizing chloritic plants, or those unable to draw a sufficient supply of nitrogen or of iron from the soil under natural processes of growth and cultivation.

One of the principal objects of the invention is to provide an adequate supply of both nitrogen and iron directly immediately and gradually and continuously assimilable by the plants, and to provide these elements compounded together so as, by their interaction, to increase mutually their availability as food for the growing plants. The fertilizing composition of my invention is rich in nitrogen and in iron necessary for the proper nutrition of the plants, and provides special advantages from their admixture and concurrent application to the growing plants.

One of the elements or materials of the fertilizing composition is an organic nitrogenous or proteid material, such as dried blood, fish scrap, tankage, or cotton seed meal, and in combination therewith a mineral which through decomposition will provide easily assimilable iron for the growing plants.

Organic fertilizers, such as those above referred to, are in general use, but their decomposition or solution by the action of the elements so as to render them assimilable by the plants is exceedingly slow, as is likewise their decomposition by bacteriological processes.

Pyrites or iron disulfide, used as a fertilizer, and under the action of the elements, particularly moisture and air, in a finely comminuted state, is resolved into iron sulfate and sulfuric acid. In such finely comminuted or powdered condition the pyrites frequently causes injury to the plants, particularly when applied directly thereto, by reason of the acidity of the products of oxidation or other decomposition of the pyrites.

I have discovered that by using an organic nitrogenous or proteid fertilizer, such as dried blood, in admixture with an iron-containing mineral, such as pyrites, certain very great advantages are obtained which are not realized from the use of these fertilizers or materials separately. I, therefore, mix these fertilizing materials and apply the composition either to the soil or directly to the plants. The organic nitrogenous or proteid matter, neutralizes or renders negligible the otherwise injurious action of the acid or other decomposition products of the powdered pyrites or other iron bearing material, without interfering with the availability to the plants of the iron formed.

On the other hand, not only does my composition prevent injury to the plant from the acid, just described, but on the contrary the acid formed by the decomposition of the pyrites, or other mineral, promotes the rapid hydrolysis and solution of the organic nitrogenous or proteid material, and renders the nitrogen of the same immediately, rapidly, and easily available to, and assimilable by the plants.

In the preferred form of practicing my process, I employ about two parts by weight of organic nitrogenous or proteid fertilizer to one part of pyrites, preferably in powdered form. The mixture or composition, however, may be varied within relatively wide limits, as may be found beneficial or advisable under particular conditions, such as variations in soil or in the plants treated. In certain cases it may be advantageous to employ twenty parts by weight of the organic fertilizer to one part pyrites, and in other instances, to employ ten parts of pyrites by weight to one part of the organic material. It will be understood, however, that the particular ratios and proportions of the material are illustrative and suggestive but are not limiting or restrictive of the invention. The most advantageous composition will depend upon the soil and the relative needs of the plants for nitrogen and iron.

Such a fertilizing composition as I have described may be applied to the soil in the usual manner for many different kinds of plants. It will be found especially advantageous, however, for chloritic or yellow plants, such as often result from a manganiferous soil. One very efficient manner of applying the fertilizer is by sprinkling or spraying on the leaves or leaf axils of the plants. This is a very convenient and successful method in the case of chloritic pineapple plants.

In many cases it may be found beneficial to use instead of the ordinary iron pyrites, any of the sulfides of iron, or copper and iron pyrites (chalcopyrite), or any natural ore containing iron sulfides, in any case finely pulverizing the mineral. With certain of these minerals, and under certain climatic conditions, the pyrites in decomposing will furnish appreciable quantities of copper sulfate, and the fungicidal action thereof will be very beneficial to the plants.

If desired, a small amount of ammonium sulfate may be added to the fertilizing mixture above described, to hasten the process of decomposition or dissolution, especially where it is desirable to increase the supply of quickly available nitrogen.

It will be understood that the proportions indicated above, are not restrictive of the invention, but are those which I have found most advantageous from actual use of the invention under ordinary growing conditions.

What I claim is:—

1. A fertilizing composition containing copper and iron sulfide and an organic nitrogenous fertilizer.

2. A fertilizing composition containing pyrites, an organic nitrogenous fertilizer, and ammonium sulfate.

3. The process of gradually supplying nitrogen and iron directly to plants comprising applying thereto a dusting compound containing a proteid material and a compound of iron, which interact with each other gradually and gradually release to the plant nitrogen and iron in soluble form.

4. The process of gradually supplying nitrogen and iron to plants, comprising applying directly to the leaves and stalks of the plant a proteid material and iron sulfide, the sulfide gradually oxidizing to the sulfate and sulfuric acid, the iron sulfate being assimilated by the plant and the sulfuric acid acting to decompose the proteid material into a form readily assimilable by the plant.

In testimony whereof, I have signed my name to this specification.

MAXWELL O. JOHNSON.